(12) United States Patent
Noh et al.

(10) Patent No.: US 7,632,003 B2
(45) Date of Patent: Dec. 15, 2009

(54) BACK LIGHT UNIT

(75) Inventors: Jae Heon Noh, Yongin-si (KR); Dong Seob Jang, Seoul (KR); Seong Ho Youn, Suwon-si (KR); Sun Gil Kim, Suwon-si (KR); Hye Eun Park, Suwon-si (KR); Yong Joon Choi, Suwon-si (KR); Kyong Hak Seo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/898,057

(22) Filed: Sep. 7, 2007

(65) Prior Publication Data

US 2008/0112185 A1 May 15, 2008

(30) Foreign Application Priority Data

Nov. 9, 2006 (KR) .................... 10-2006-0110752

(51) Int. Cl.
  *F21V 7/04* (2006.01)
(52) U.S. Cl. ...................................... 362/620; 362/337
(58) Field of Classification Search ................. 362/326, 362/327, 328, 330, 332, 336, 337, 561, 608, 362/609, 610, 611, 612, 613, 615, 616, 617, 362/621, 623, 625, 626; 349/61, 62, 65
See application file for complete search history.

(56) References Cited

U.S. PATENT DOCUMENTS

| | | | | |
|---|---|---|---|---|
| 5,997,148 A * | 12/1999 | Ohkawa | ..................... | 362/619 |
| 6,802,619 B2 * | 10/2004 | Ohizumi et al. | ............. | 362/603 |
| 6,921,178 B2 * | 7/2005 | Ohkawa | ..................... | 362/620 |
| 7,040,796 B2 * | 5/2006 | Sugiura et al. | .............. | 362/608 |
| 7,097,341 B2 * | 8/2006 | Tsai | ........................... | 362/625 |
| 7,206,491 B2 * | 4/2007 | Feng et al. | ................. | 385/146 |
| 7,377,678 B2 * | 5/2008 | Huang et al. | ................ | 362/608 |
| 7,431,491 B2 * | 10/2008 | Liao | ........................... | 362/620 |

FOREIGN PATENT DOCUMENTS

| JP | 11184386 A | * | 7/1999 |
|---|---|---|---|
| KR | 20-2004-0031109 | | 3/2005 |

* cited by examiner

*Primary Examiner*—Hargobind S Sawhney
(74) *Attorney, Agent, or Firm*—Staas & Halsey LLP

(57) ABSTRACT

A back light unit, in which bright lines produced from point light sources, light emitting diodes, in an oblique direction are removed, so that brightness can be uniformly maintained at a liquid crystal panel. The back light unit includes a prism light guide plate, light emitting diodes provided on one side of the prism light guide plate, and a bright-line dead section provided to the prism light guide plate so as to uniformly scatter light of each light condensing section generated by light emitted from the light emitting diodes, to prevent a spectrum of the light in a specific direction, and to prevent bright lines from being produced.

15 Claims, 7 Drawing Sheets

BACK LIGHT UNIT

CROSS-REFERENCE TO RELATED APPLICATIONS

This application claims the benefit of Korean Patent Application No. 10-2006-0110752, filed on Nov. 9, 2006, in the Korean Intellectual Property Office, the disclosure of which is incorporated herein by reference.

BACKGROUND OF THE INVENTION

1. Field of the Invention

The present invention relates to a back light unit. More particularly to a back light unit, in which the production of bright lines, derived from high-luminosity light condensing sections generated from point light sources is prevented, thereby allowing brightness to be uniformly maintained at a liquid crystal panel.

2. Description of the Related Art

A conventional back light unit functions as an illuminator for a non-emissive flat panel display such as a liquid crystal display, and can be divided into a direct light type and an edge light type according to arrangement of a light source.

The conventional direct light type back light unit is a back light unit in which the light source is installed just below the flat panel display, and thus, directly irradiates light to the flat panel display, whereas a conventional edge light type back light unit refers to a back light unit in which the light source is installed on one side of the flat panel display and thus, irradiates light to the flat panel display by means of a light guide plate that will be described below.

The light source is categorized into a line light source and a point light source. The typical line light source includes a cold cathode fluorescent lamp (CCFL) in which electrodes are installed to opposite ends of a tube, while the point light source includes a light emitting diode (LED).

A CCFL can emit a high intensity of white light, obtain high brightness and high uniformity, and provide a large-area layout. However, a CCFL is driven by a high-frequency alternating current signal and has a narrow operating temperature range.

In contrast, a LED is degraded in performance compared to a CCFL, but it is driven by a direct current signal, has a long lifetime and a wide operating temperature range, and can be made thin.

Meanwhile, the light guide plate is used in the edge light type back light unit, converts the incident light from the line or point light source into surface light, sends out the surface light in a vertical direction, and is made of acryl-based transparent resin having high light transmissivity such as poly methyl methacrylate (PMMA), or olefin-based transparent resin.

A reflector plate is provided on a rear surface of the light guide plate so as to return the light deflected from the light guide plate back to the light guide plate. An optical sheet is provided on a front surface of the light guide plate so as to diffuse the light emitted from the light guide plate.

Recently, a prism light guide plate having prisms formed on a rear surface thereof, has been used for high brightness and low costs. The prism light guide plate is a light guide plate having a prism pattern formed on the rear surface, at a fine pitch. Thus, the prism light guide plate can obtain brightness higher than the previous light guide plate, although one reverse prism sheet is used instead of a plurality of prism sheets.

As shown in FIG. 1, a conventional back light unit 10 includes a prism light guide plate 13, a plurality of point light sources 23 provided on the one side 18 of the prism light guide plate 13, and a reflector plate 27 provided below the prism light guide plate 13.

In this state, when the point light sources 23 emit light, the light is incident on an incoming light section 13a provided on one side 18 of the prism light guide plate 13, is reflected in the prism light guide plate 13, and then comes out of an outgoing light section 13b provided on an upper portion of the prism light guide plate 13.

Further, among the light incident on the prism light guide plate 13, the light deflected downwards is reflected by the reflector plate 27, is incident on the prism light guide plate 13 again, and then comes out through the outgoing light section 13b.

However, when the point light sources 23 emit light toward the incoming light section 13a, the luminosity is relatively increased around the incoming light section as illustrated in FIG. 6A, so that dot-like light condensing sections are generated. The light of each light condensing section forms a spectrum by means of a prism pattern 16 of the prism light guide plate 13, so that bright lines are produced in an oblique direction, and thereby a quality of image is degraded.

In order to solve this problem, in the conventional back light unit each prism is rounded off, or the prism pattern is applied to the incoming light section. However, this method has its limits to remove the bright lines produced in an oblique direction.

The conventional edge light type back light unit is used in a laptop computer or a mobile phone. In the case of the mobile phone, the bright lines produced in an oblique direction make it impossible to use the prism light guide plate.

SUMMARY OF THE INVENTION

Accordingly, it is an aspect of the present invention to provide a back light unit capable of preventing bright lines from being produced in an oblique direction by means of light condensing sections generated by point light sources, thereby improving a poor quality of image.

Additional aspects and/or advantages of the invention will be set forth in part in the description which follows and, in part, will be apparent from the description, or may be learned by practice of the invention.

The foregoing and/or other aspects of the present invention are achieved by providing a back light unit including a prism light guide plate to guide light and including light emitting diodes on a side of the prism light guide plate, to emit light, and a bright-line dead section to uniformly scatter light of light condensing sections generated by light emitted from the light emitting diodes, to prevent a spectrum of the light in a specific direction, and to prevent bright lines from being produced.

According to an aspect of the present invention, the bright-line dead section includes a plane part provided to the prism light guide plate adjacent to the light emitting diodes, and a prism section provided on a side of the plane part and reflecting the light irradiated by the light emitting diodes.

Further, according to an aspect of the present invention, the plane part includes a width greater than that of each light condensing section generated by the light emitted from each light emitting diode.

Further, according to an aspect of the present invention, the bright-line dead section further includes light-blocking walls provided on a side of the prism section which is adjacent to the plane part, and blocking the light traveling from the light condensing section to the prism section in an oblique direction, and inclined faces extending from the light-blocking walls, provided on a side of an upper portion of the prism section, and uniformly scattering the light passing through the light-blocking walls.

Also, according to an aspect of the present invention, each of the inclined faces includes a triangular shape, and a widest width at an edge that is shared with each light-blocking wall, and is gradually narrowed in proportion to a distance from the edge.

In addition, according to an aspect of the present invention, each of the inclined faces includes a region corresponding to a region of the light that diverges from each light condensing section, generated by the light emitted from each light emitting diode, in the oblique direction.

Further, according to an aspect of the present invention, the plane part includes a thickness less than one-third of a height of the prism section.

Further, according to an aspect of the present invention, each of the light-blocking walls includes a height greater than one-third of a height of the prism section.

It is another aspect of the present invention to provide a back light unit including a light guide plate including prisms on a surface thereof, a reflector plate to face the prisms of the light guide plate, light emitting diodes spaced apart from one side of the light guide plate, and a bright-line dead section on one side of the light guide plate so as to uniformly scatter light of each light condensing section generated by light emitted from each light emitting diode in all directions and to prevent bright lines from being produced in a specific direction.

According to an aspect of the present invention, the bright-line dead section includes a plane part on a side of the light guide plate and being adjacent to the light emitting diodes, and the plane part includes a width greater than that of each light condensing section.

Further, according to an aspect of the present invention, the prism section is on one side of the plane part, and the bright-line dead section further includes light-blocking walls that are connected with the plane part and are provided on one side of the prism section, and inclined faces that extend from the light-blocking walls and are provided on an upper portion of the prism section.

Further, according to an aspect of the present invention, each of the inclined faces covers the light deflected from each light condensing section in an oblique direction.

In addition, according to an aspect of the present invention, each of the inclined faces is provided from a portion connected with each light-blocking wall to a top of the prism section.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
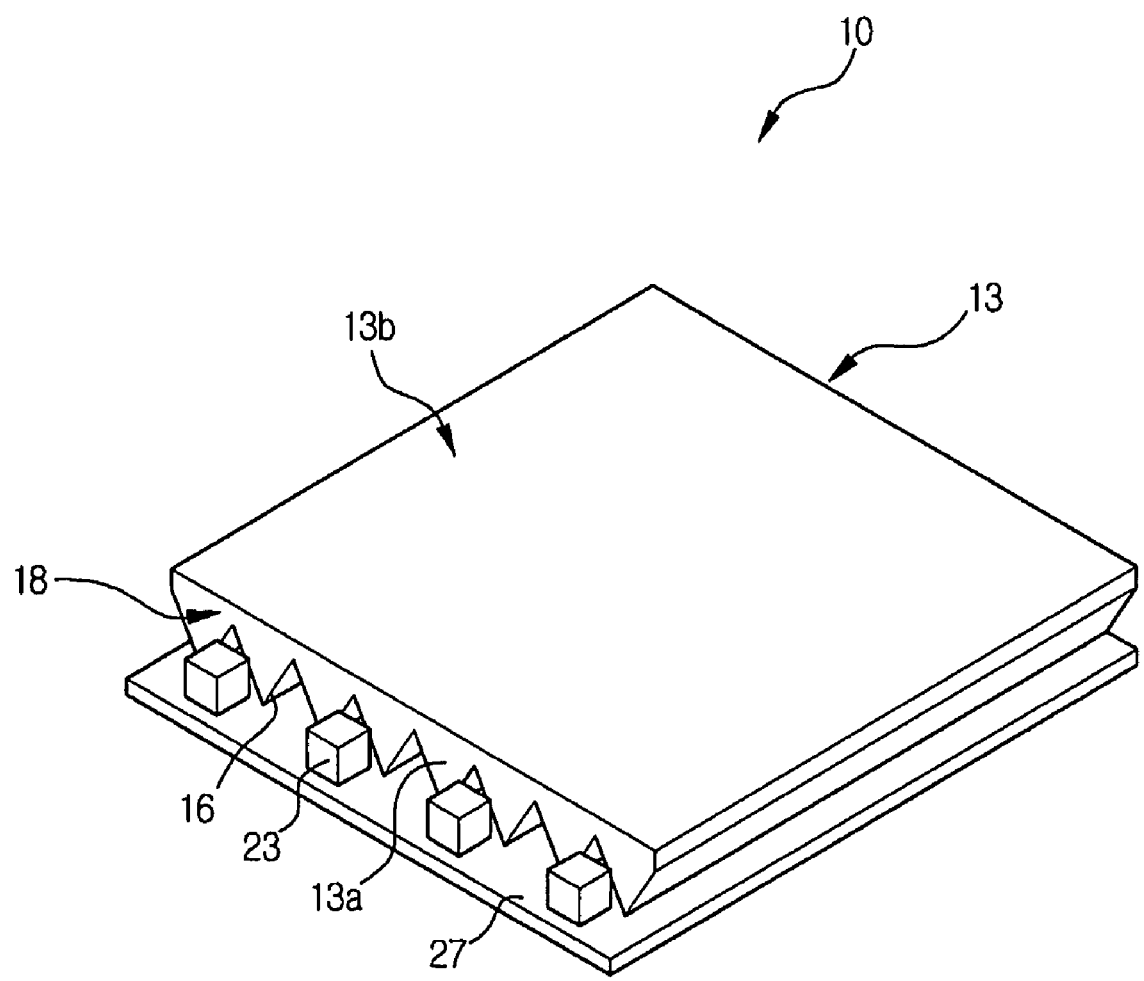
FIG. 1 is a perspective view illustrating a conventional back light unit.

Reference will now be made in detail to the embodiments of the present invention, examples of which are illustrated in the accompanying drawings, wherein like reference numerals refer to the like elements throughout. The embodiments are described below to explain the present invention by referring to the figures.

A back light unit 30 according to the present invention, comprises a prism light guide plate 33, a reflector plate 45 provided below the prism light guide plate 33, light emitting diodes 42 provided on one side of the prism light guide plate 33, and a reverse prism sheet 50 provided above the prism light guide plate 33.

A bright-line dead section 35 is provided on a part of the prism light guide plate 33, which is adjacent to the light emitting diodes 42, to prevent bright lines from being produced in an oblique direction by preventing a spectrum of light of each light condensing section generated by light emitted from the light emitting diodes 42.

A prism section 34 comprising a plurality of prisms, each of which extends in one direction, is provided on one side of the bright-line dead section 35. The prism section 34 induces the light emitted from the light emitting diodes 42 and the light reflected by the reflector plate 45, and provides them to the reverse prism sheet 50.

The bright-line dead section 35 comprises a plane part 36 formed to be flat on one side of the prism light guide plate 33, light-blocking walls 37 forming one sidewall of the prism section 34, and inclined faces 39 formed by obliquely cutting off a corner of the prism section 34.

Meanwhile, the reverse prism sheet 50 is disposed above the prism light guide plate 33, and collects and diffuses the light guided by the prism light guide plate 33, thereby controlling a brightness characteristic of the light.

The reverse prism sheet 50 comprises a plurality of prisms, which is discontinuously formed toward an outgoing light section 33a of the prism light guide plate 33. These prisms of the reverse prism sheet 50 are arranged to be substantially perpendicular to the prisms of the prism light guide plate 33.

The reflector plate 45 is disposed below the prism light guide plate 33, and reflects the light, which is deflected from the prism light guide plate 33, onto the prism light guide plate 33.

A detailed construction of the bright-line dead section 35 provided to the prism light guide plate 33 will be described with reference to FIG. 3.

The plane part 36 is provided to a space separated from one end of the prism light guide plate 33, which is adjacent to the light emitting diodes 42, to the prism section 34, and is formed to be flat without a protrusion.

According to an embodiment of the present invention, a width of the plane part 36 is greater than that of each light condensing section formed by emission of light of the light emitting diodes 42. That is, when each light condensing section is located in the plane part 36, the light forming each light condensing section is uniformly scattered in all directions, so that a spectral phenomenon does not occur in a specific direction, and particularly in an oblique direction, and thus, the problem of the conventional art, i.e. the generation of the oblique bright lines is prevented.

Meanwhile, the prism section 34 is located on one side of the plane part 36, and one sidewall of the prism section 34 comprises the light-blocking walls 37, which block a portion of the light scattered from each light condensing section in an oblique direction.

The prism section 34 comprises prism crests 34a protruding upwards, and prism roots 34b provided between the prism crests 34a.

Each inclined face 39 comprises a predetermined inclined angle by obliquely cutting off one upper corner of the prism section 34 which is adjacent to the light-blocking walls 37, and covers a low luminosity of light, which is oriented in an oblique direction and is not blocked by each light-blocking wall 37, thereby preventing the spectral phenomenon. Thus, the inclined faces 39 prevent bright lines from being produced in an oblique direction.

Figure 3:
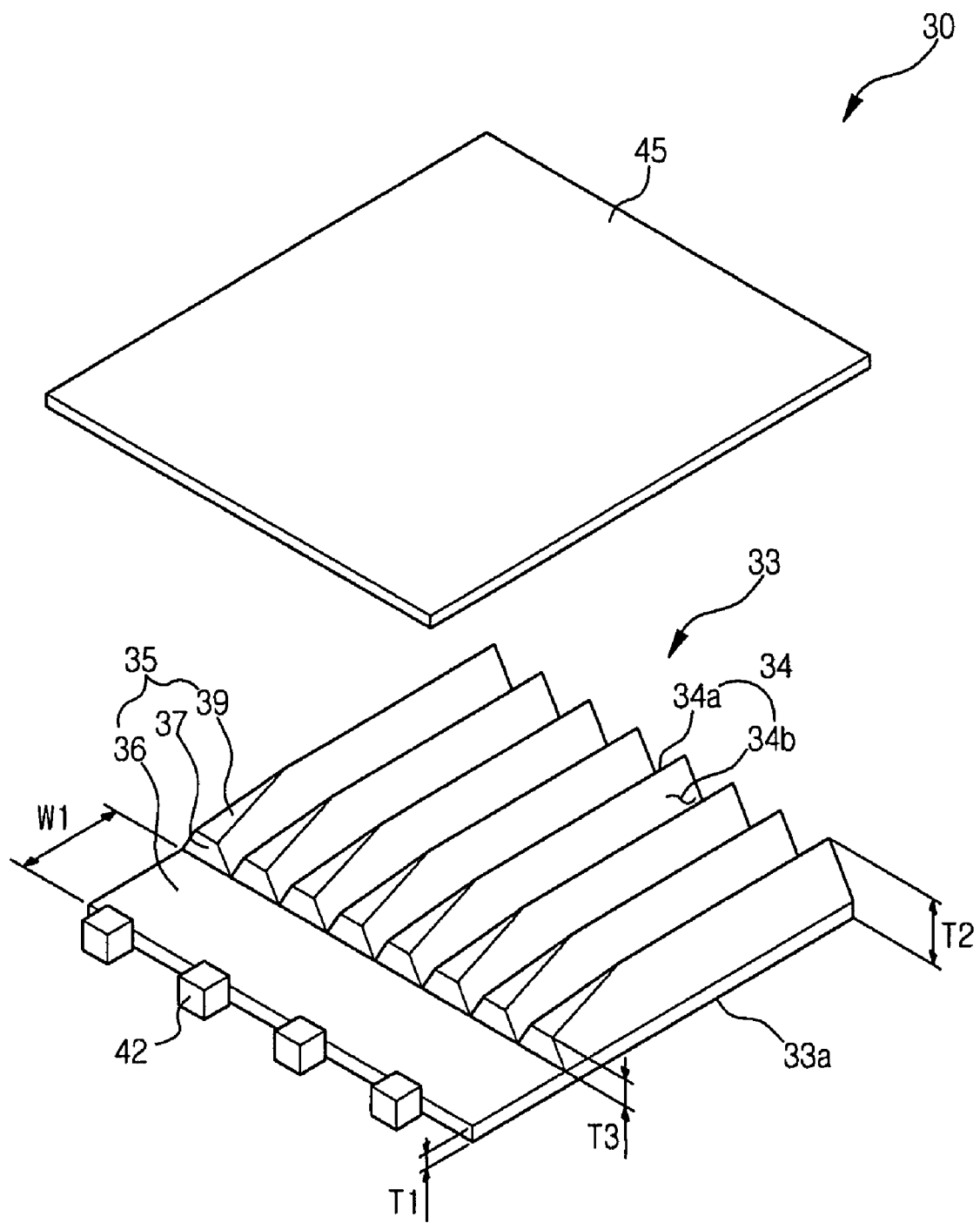
FIG. 3 is a perspective view illustrating a prism light guide plate according to an embodiment of the present invention.

According to an embodiment of the present invention, each inclined face 39 comprises a triangular shape as shown in FIG. 3, for example. Accordingly, each inclined face 39 comprises a widest width at an edge that is shared with each light-blocking wall 37, and is gradually narrowed in proportion to a distance from the edge.

According to an embodiment of the present invention, a thickness T1 of the plane part 36 is less than one-third of a height T2 ranging from a lower surface of the plane part 36 to the top of the prism section 34. That is, if the thickness of the plane part 36 becomes too thick, it is difficult to relatively make the back light unit 30 slim.

According to an embodiment of the present invention, a height T3 of each light-blocking wall 37 is greater than one-third of a height T2 ranging from a lower surface of the plane part 36 to the top of the prism section 34. That is, only when each light-blocking wall 37 exceeds a predetermined height, the light scattered from each light condensing section can be blocked from being scattered toward the prism section 34.

Hereinafter, method of preventing the bright lines from being produced by the bright-line dead section 35 according to an embodiment of the present invention will be described.

Figure 4:
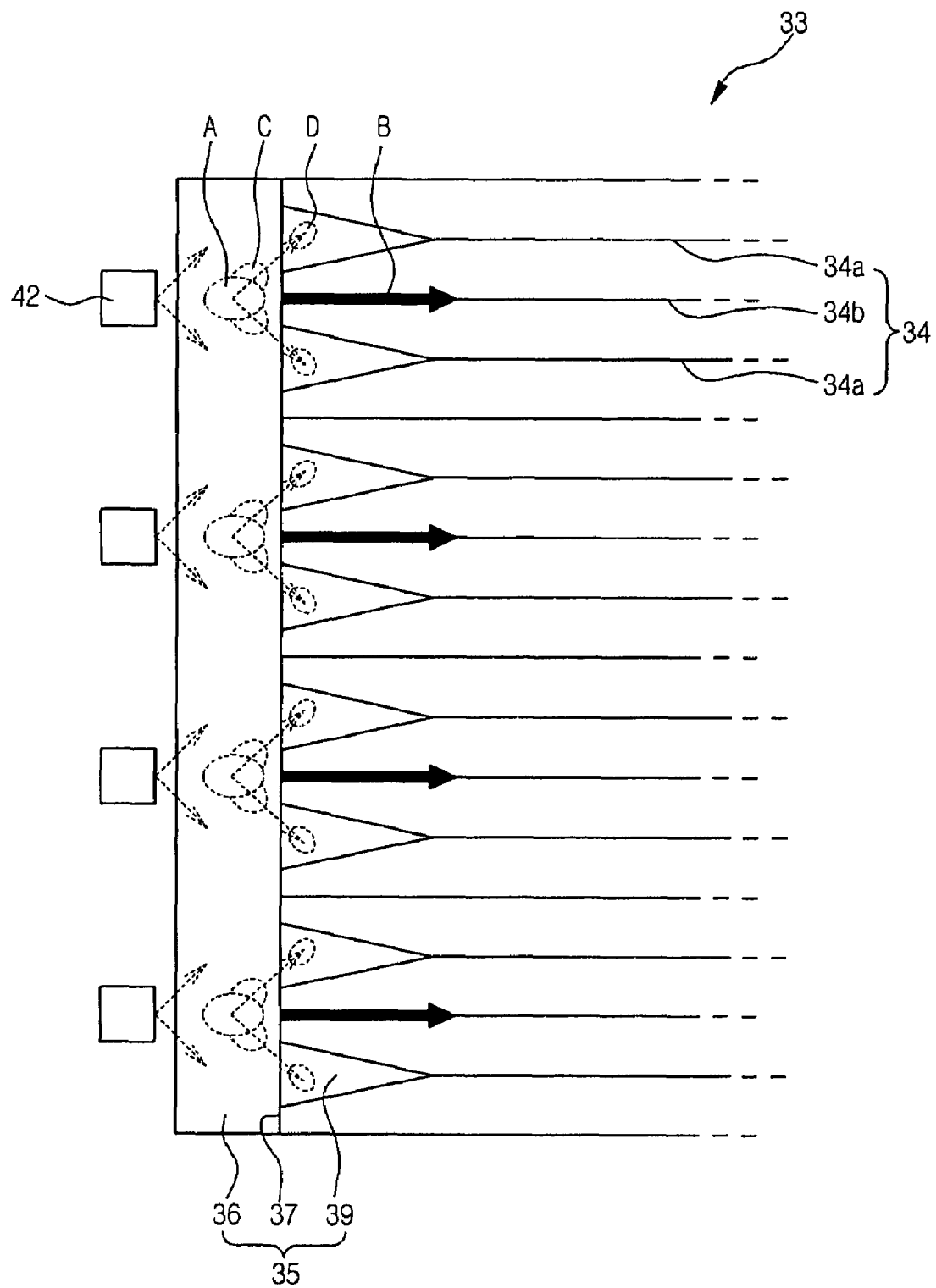
FIG. 4 is a rear view illustrating a light delivery path according to an embodiment of the present invention.

As shown in FIG. 4, when the light emitting diodes 42 emit light, the light is irradiated within a range of approximately 90 degrees. At this time, the luminosity according to the radiation angle is the strongest at a front of the light emitting diodes 42, and is gradually weakened in opposite directions starting from the front of the light emitting diodes 42.

Figure 2:
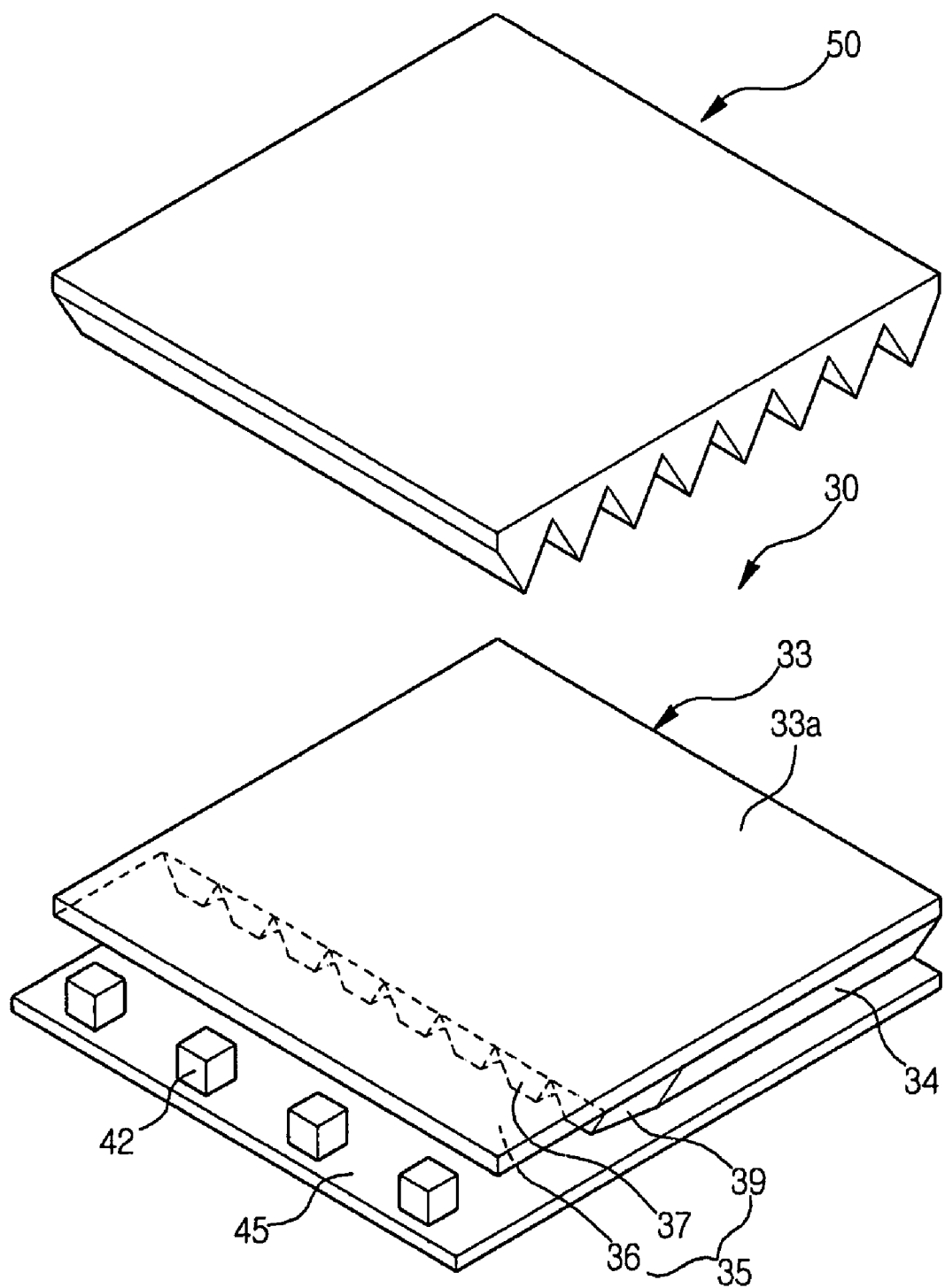
FIG. 2 is a perspective view illustrating a conventional back light unit according to the present invention.

Thus, the light from the front of the light emitting diodes 42 is guided between the prism roots 34b, thereby traveling straight. Then, the light is incident on each prism of the prism section 34, is reflected in the prism section 34, and travels toward the outgoing light section 33a (see FIG. 2). Subsequently, the light passes through the reverse prism sheet 50 (see FIG. 2), and then is irradiated to the liquid crystal panel (not shown).

Thus, each light condensing section A is formed apart from each light emitting diode 42 at a predetermined interval in front of the light emitting diodes 42, and comprises an elliptical shape.

According to an embodiment of the present invention, among the light scattered from each light condensing section A, the light B running toward the prism roots 34b travels into the prism section 34 as described above, but the light C running in an oblique direction is blocked by the light-blocking walls 37.

Meanwhile, the light D that is not blocked by the light-blocking walls 37 reaches the inclined faces 39 with low luminosity. According to an embodiment of the present invention, the inclined faces 39 are flatly inclined without a separate refraction structure as in the prism, so that the light reaching the inclined faces 39 does not form a spectrum and thereby the corresponding bright lines. Therefore, the light reaching the inclined faces 39 is uniformly scattered on the inclined faces 39.

Figure 5:
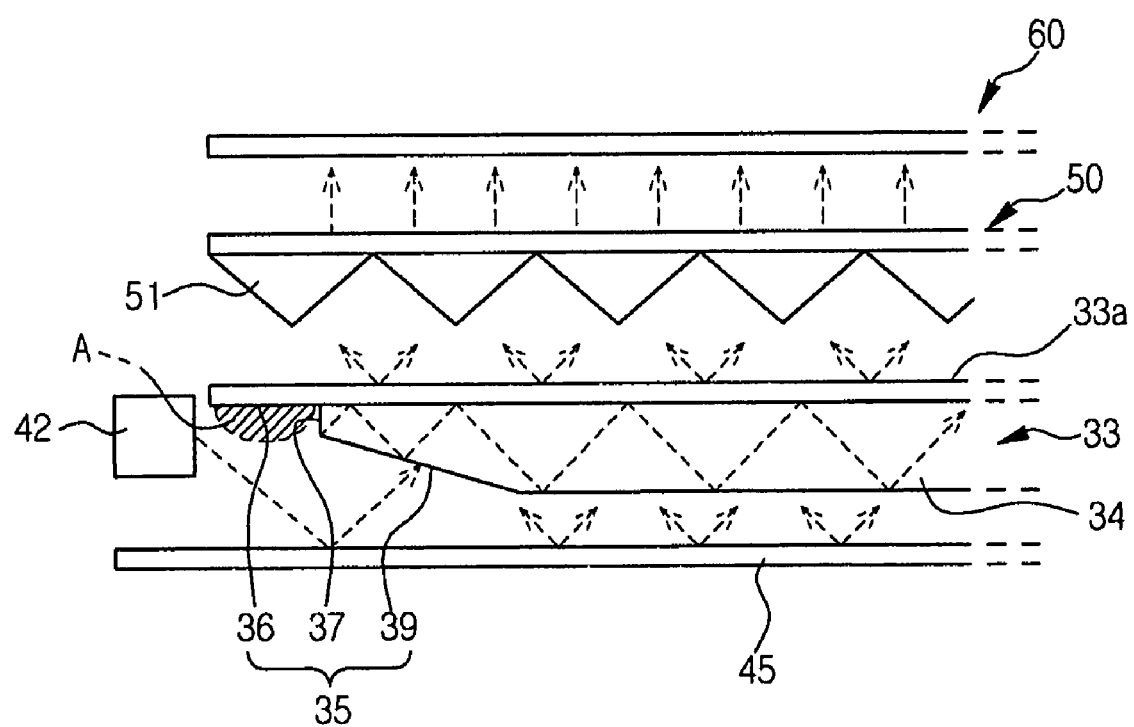
FIG. 5 is a plan view illustrating a light delivery path according to an embodiment of the present invention.

As shown in FIG. 5, when the light emitting diodes 42 emit light, the light emitted from the light emitting diodes 42 is incident on the prism light guide plate 33, is reflected in the prism section 34 of the prism light guide plate 33, and travels toward the outgoing light section 33a. Part of the light which is deflected from the prism section 34, is reflected by the reflector plate 45, returns to the prism section 34, and comes out of the outgoing light section 33a.

According to an embodiment of the present invention, the reflector plate 45 reduces the loss of light by means of the reflection, and simultaneously improves the uniformity of the light coming out of the outgoing light section 33a of the prism light guide plate 33.

Thus, the light coming out of the outgoing light section 33a travels toward the reverse prism sheet 50. Further, the outgoing light travels in an oblique direction but not in a vertical direction.

This outgoing light is incident in a direction perpendicular to the liquid crystal panel 60 due to the refraction caused by reverse prisms 51 of the reverse prism sheet 50. In this respect, the reverse prism sheet 50 increases the front brightness of light.

According to an embodiment of the present invention, the width of each light condensing section A formed at the front of each light emitting diode 42 is less than that of the plane part 36. The light forming each light condensing section A is uniformly scattered on the plane part 36.

The light traveling from the light condensing sections A in a direction parallel to the prism section 34 is incident on the prism section 34, is reflected in the prism section 34, and comes out of the outgoing light section 33a.

However, the light traveling from the light condensing sections A to the prism section 34 in an oblique direction is blocked by the light-blocking walls 37. Further, the light that has low luminosity and is not blocked by the light-blocking walls 37 does not form a spectrum at the inclined faces 39, and is uniformly scattered throughout the inclined faces 39. Therefore, the bright lines are prevented from being produced in an oblique direction as in the conventional art.

Figure 6A:
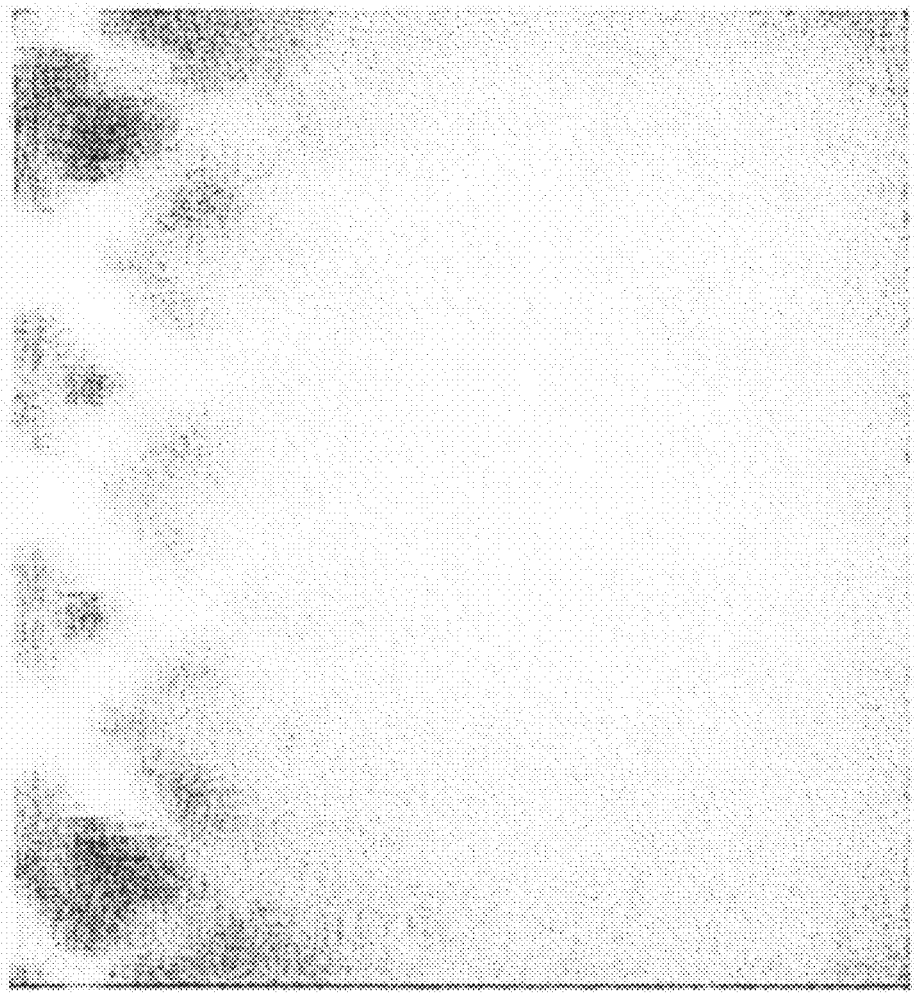
FIG. 6A is a photograph illustrating a quality of image on a conventional liquid crystal panel.

FIG. 6A is a photograph illustrating a quality of image on a conventional liquid crystal panel, where bright lines produced in an oblique direction. It can be found that the light condensing sections are shown around the places where the light emitting diodes are installed, and that the white long bright lines start from the light condensing sections to be produced in an oblique direction. These bright lines produced in an oblique direction are responsible for deteriorating display quality of the liquid crystal panel.

Figure 6B:
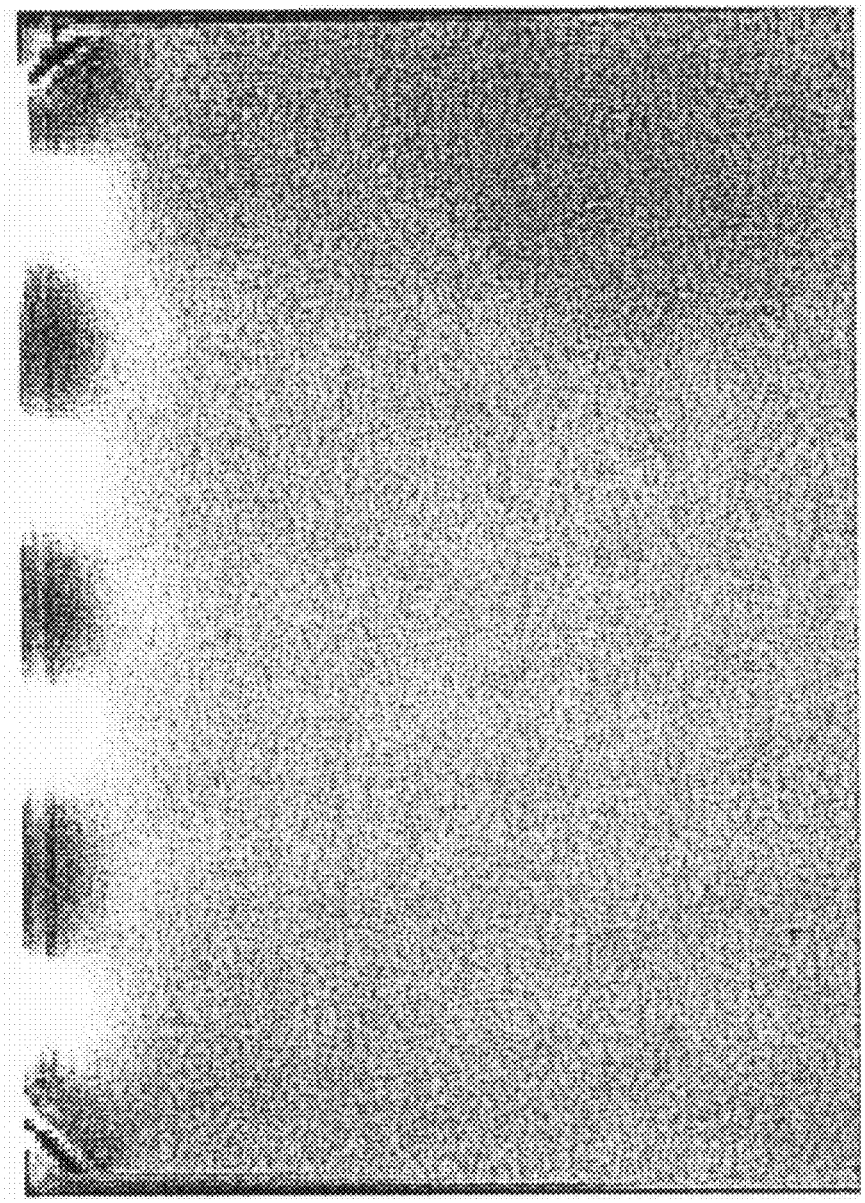
FIG. 6B is a photograph illustrating a quality of image on a liquid crystal panel according to an embodiment of the present invention.

However, as shown in FIG. 6B, in the liquid crystal panel realized according to an embodiment of the present invention, the bright light condensing sections are shown only at the light emitting diodes, and the bright lines starting from the light condensing sections to extend in an oblique direction are not produced. Thus, it is possible to prevent the display quality of the liquid crystal panel from being deteriorated, and to increase brightness.

According to an embodiment of the present invention, the bright-line dead section is separately provided to the prism light guide plate, so that the spectral phenomenon caused by the light condensing sections is prevented, and thereby the production of the bright lines extending from each light condensing section in an oblique direction can be prevented.

In this manner, the production of the bright lines is prevented, so that it is possible to prevent the display quality of the liquid crystal panel from being deteriorated, and to increase brightness.

Further, the brightness is increased, and thus the display quality is improved. As such, although the number of light emitting diodes is reduced compared to that of the conventional art, the brightness is not reduced. Accordingly, the burden of costs can be reduced, and thus an economical profit can be obtained.

In addition, according to an embodiment of the present invention, the bright lines are suppressed from being produced in an oblique direction, so that the prism light guide plate can be used in the liquid crystal panel for a mobile phone. Thus, according to an embodiment of the present invention, only one reverse prism sheet can be used without using two reverse prism sheets as in the related art, so that the costs can be saved, and the tendency to make the mobile phone light and slim can be accelerated.

Although few embodiments of the present invention have been described, it would be appreciated by those skilled in the art that changes may be made in these embodiments without departing from the principles and spirit of the invention, the scope of which is defined in the claims and their equivalents.

What is claimed is:

1. A back light unit, comprising:
    a prism light guide plate to guide light and comprising:
        light emitting diodes provided on a side of the prism light guide plate configured to emit light; and
        a bright-line dead section comprising:
            a plane part provided to the prism light guide plate adjacent to the light emitting diodes,
            a prism section provided on a side of the plane part and reflecting the light irradiated by the light emitting diodes,
            light-blocking walls provided on a side of the prism section which is adjacent to the plane part and blocking light traveling from the light emitting diodes to the prism section in an oblique direction; and
            inclined faces extending from the light-blocking walls, provided on a side of an upper portion of the prism section, and uniformly scattering the light passing through the light-blocking walls.

2. The back light unit as claimed in claim 1, wherein the plane part comprises a width greater than that of each light spread emitted from each light emitting diode.

3. The back light unit as claimed in claim 1, wherein each of the inclined faces comprises a triangular shape, and a widest width at an edge which is shared with each light-blocking wall, and is gradually narrowed in proportion to a distance from the edge.

4. The back light unit as claimed in claim 3, wherein each of the inclined faces comprises a region corresponding to a region of the light that diverges from each light spread emitted from each light emitting diode, in the oblique direction.

5. The back light unit as claimed in claim 1, wherein the plane part comprises a thickness less than one-third of a height of the prism section.

6. The back light unit as claimed in claim 1, wherein each of the light-blocking walls comprises a height greater than one-third of a height of the prism section.

7. A back light unit, comprising:
    a light guide plate comprising prisms on a surface thereof;
    a reflector plate provided to face the prisms of the light guide plate;
    light emitting diodes spaced apart from a side of the light guide plate; and
    a bright-line dead section comprising:
        a plane part provided to the prism light guide plate adjacent to the light emitting diodes,
        a prism section provided on a side of the plane part and reflecting the light irradiated by the light emitting diodes,
        light-blocking walls provided on a side of the prism section which is adjacent to the plane part and blocking the light traveling from the light emitting diodes to the prism section in an oblique direction; and
        inclined faces extending from the light-blocking walls, provided on a side of an upper portion of the prism section, and uniformly scattering the light passing through the light-blocking walls.

8. The back light as claimed in claim 7, wherein:
    the plane part comprises a width greater than that of each light spread emitted from each light emitting diode.

9. The back light unit as claimed in claim 7, wherein each of the inclined faces covers the light deflected from each light spread in an oblique direction.

10. The back light unit as claimed in claim 7, wherein each of the inclined faces is provided from a portion connected with each light-blocking wall to a top of the prism section.

11. A back light unit, comprising:
    a prism light guide plate to guide light and comprising:
    light emitting diodes on a side of the prism light guide plate, and
    a bright-line dead section comprising:
        a plane part to be flat and positioned at a side of the prism light guide plate adjacent to the light emitting diodes,
        a prism section provided on a side of the plane part and reflecting the light irradiated by the light emitting diodes,
        light-blocking walls formed along a side wall of the prism section; and
        inclined faces formed by obliguely cutting off a corner of the prism section such that the inclined faces are flatly inclined.

12. The back light unit of claim 11, further comprising:
    a reverse prism sheet having reverse prisms on a side thereof and provided above the prism light guide plate; and
    a reflector plate provided below the prism guide plate to reflect light which is deflected from the prism light guide plate back onto the prism light guide plate.

13. The back light unit of claim 12, wherein the prism light guide plate further comprises:
    a prism section inducing the light emitted from the light emitting diodes and the light reflected by the reflector plate and providing the light to the reverse prism sheet, the prism section comprising a plurality of prisms, each prism extending in one direction and provided at a side of the bright-line dead section; and
    an outgoing light section configured to receive light reflected by the reflector plate and to enable the light reflected to travel towards the reverse prism sheet,
    where the light traveling toward the reverse prism is incident in a direction perpendicular to a liquid crystal panel due to refraction caused by the reverse prisms of the reverse prism sheet, and the light traveling is incident on the prism section, is reflected in the prism section and is coming out the outgoing light section.

14. The back light unit of claim 11, wherein each light-blocking wall exceeds a predetermined height such that the light scattered from each light spread emitted from each light emitting diode can be blocked from being scattered toward the prism section.

15. The back light unit of claim 14, wherein each light spread emitted from each light emitting diode is formed apart from each light emitting diode at a predetermined interval in front of the light emitting diodes and comprises an elliptical shape.

* * * * *

UNITED STATES PATENT AND TRADEMARK OFFICE
CERTIFICATE OF CORRECTION

PATENT NO. : 7,632,003 B2
APPLICATION NO. : 11/898057
DATED : December 15, 2009
INVENTOR(S) : Jae Heon Noh et al.

It is certified that error appears in the above-identified patent and that said Letters Patent is hereby corrected as shown below:

Column 8, Line 42, change "obliguely" to --obliquely--.

Signed and Sealed this

Sixteenth Day of March, 2010

David J. Kappos
*Director of the United States Patent and Trademark Office*